July 24, 1951 A. Y. DODGE 2,561,913
OVERLOAD RELEASE COUPLING
Filed Sept. 29, 1945
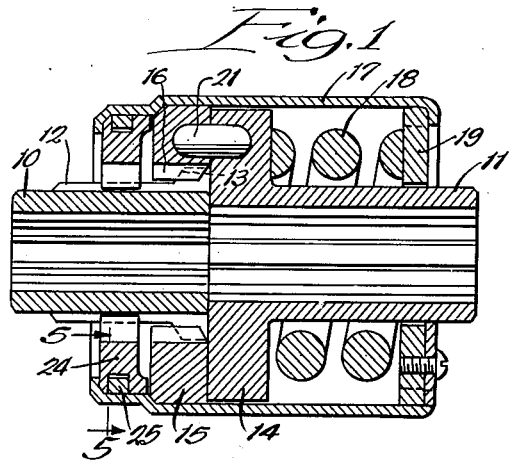
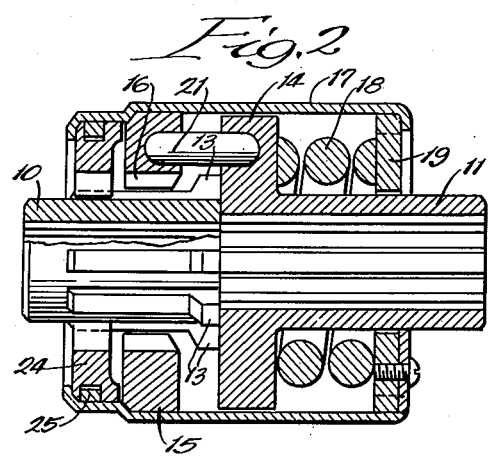
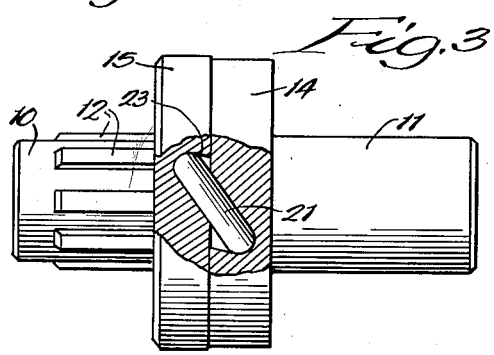
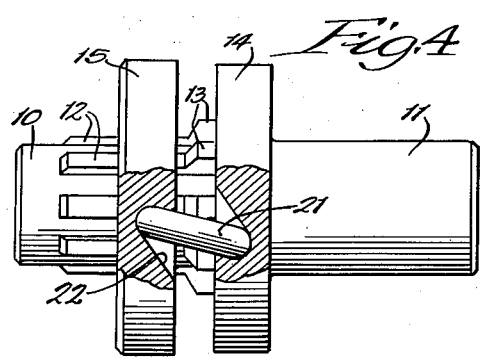
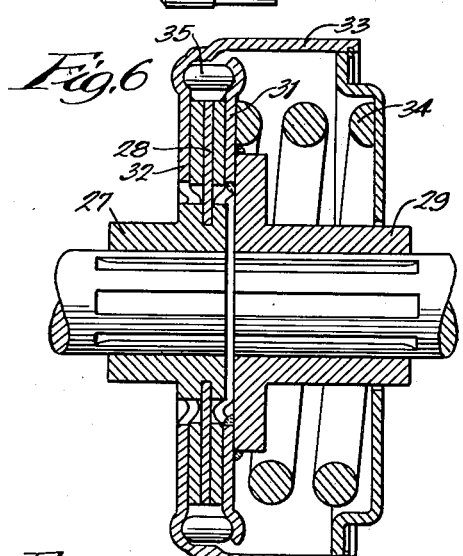
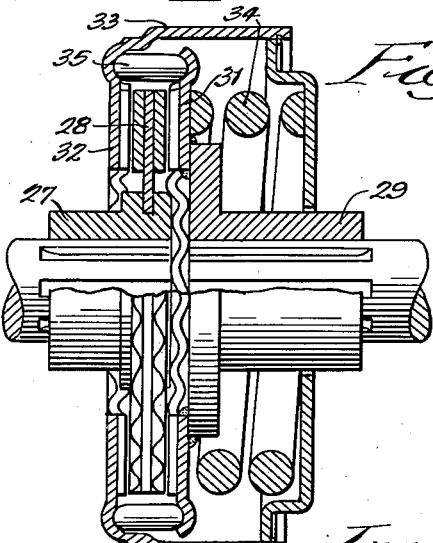
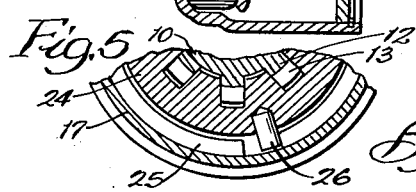
Inventor:
Adiel Y. Dodge,
By Dawson, Barth-ly Spangenberg,
Attorneys.

Patented July 24, 1951

2,561,913

UNITED STATES PATENT OFFICE 2,561,913

OVERLOAD RELEASE COUPLING

Adiel Y. Dodge, Rockford, Ill.

Application September 29, 1945, Serial No. 619,380

10 Claims. (Cl. 64—29)

This invention relates to couplings and more particularly to couplings which will automatically release in response to a predetermined torque load.

One of the objects of the invention is to provide a coupling which is simple and inexpensive to manufacture and assemble, which is positive and reliable in operation and which presents a minimum drag when disengaged.

Another object is to provide a coupling which is disengaged in response to torque through tiltable struts. According to one feature of the invention, the angle of the struts changes so that the coupling will be held disengaged by substantially less torque than that required initially to disengage it.

Still another object is to provide a coupling which will automatically reengage when the torque thereon is removed or reduced.

The above and other objects and advantages of the invention will be more readily apparent from the following description when read in connection with the accompanying drawing, in which:

Figure 1 is an axial section through a coupling showing the parts in engaged position;

Figure 2 is a view similar to Figure 1 showing the parts in disengaged position;

Figure 3 is a partial elevation with the casing removed and with parts broken away and in section;

Figure 4 is a view similar to Figure 3 showing the parts in disengaged position;

Figure 5 is a partial section on the line 5—5 of Figure 1;

Figure 6 is a view similar to Figure 1 of an alternative construction; and

Figure 7 is a similar view of still another construction.

The coupling shown in Figures 1 to 5 comprises a pair of coupling members 10 and 11 having coaxial tubular hub portions internally splined or grooved for connection to shaft sections to be coupled. The coupling member 10 is formed on its exterior with a series of splines 12 and terminates adjacent the coupling member 11 in a series of clutch teeth 13 projecting beyond the periphery of the coupling member. The coupling member 11 is formed adjacent the member 10 with a radial flange 14.

A ring 15 is movably mounted around the coupling member 10 for axial movement and rotation relative thereto. On its interior, the ring 15 is formed with a series of clutch teeth 16 which are adapted to engage the clutch teeth 13 when the ring is moved into register therewith, as shown in Figure 1. To urge the ring toward clutch engaging position, a housing 17 is connected thereto. A spring 18 in the housing abuts the flange 14 and a ring 19 closes the end of the housing to urge the ring to the right as seen in the drawings.

The ring 15 is connected to the flange 14 by a series of tiltable struts 21, the ends of which lie in recesses in the adjacent faces of the ring and the flange. As best seen in Figures 3 and 4, the recesses are formed with sloping sides 22 at one side and with relatively square shoulders 23 extending substantially axially of the clutch members. When the ring is adjacent the flange, as seen in Figure 3, the struts 21 lie against the sloping sides 22 of the recesses so that the ring and flange can engage each other. When the ring is turned relative to the flange, the struts tend to become more nearly axial as shown in Figure 4 and abut the shoulders 23 to limit additional rotation of the ring.

When the coupling is in engaged position, as shown in Figure 1, torque is transmitted from the member 10 through teeth 13 and 16 to the ring 15. From the ring 15, the torque is transmitted through the struts 21 to the flange 14 and the member 11. When the torque increases to a predetermined maximum value which is fixed by the strength of the spring 18 and the angle of the struts, the ring 15 tends to rotate relative to the flange 14 so that the struts will move to the position shown in Figure 4. At this time, the struts will shift the ring 15 to the left to disengage the teeth 16 from the teeth 13, thereby to interrupt the connection between the coupling members.

It will be noted that when the struts are in the position shown in Figure 3, their mechanical advantage over the spring 18 is very small so that a high torque will be required to cause the struts to move the ring to the left. Once this motion has started, however, the angle becomes more favorable to the struts so that their mechanical advantage over the spring increases. Therefore, once the ring starts to move, it will move rapidly to the clutch disengaging position. When in this position, a relatively small amount of torque will be sufficient to hold the clutch parts disengaged due to the high mechanical advantage of the struts over the spring.

In order to hold the clutch parts in disengaged position friction means are provided to impose a light friction drag on the parts. As shown, the friction means comprise a ring 24 splined on the coupling member 19 and fitting loosely against the inner surface of the housing 17. The ring is formed with a peripheral groove in which a resilient friction band 25 fits. The band is split with its ends separated and normally tends to expand so that it will frictionally engage the inner surface of the housing. A pin 26 carried by the ring 24 fits loosely between the ends of the band to provide a lost motion connection limiting turning of the ring 24 relative to the band.

When the clutch parts are disengaged, the friction drag of the band against the housing is sufficient to hold them disengaged by applying a relatively light torque to the ring sufficient to hold the struts in the position shown in Figure 4 against the force of the spring 18. Upon removal of the torque load, the spring will urge the ring 15 toward the flange tilting the struts to the position shown in Figure 3. The relatively small amount of rotation required to accomplish this is permitted by the lost motion connection between the ring 24 and the band 25 so that the ring 24 can turn at this time without turning the band. Therefore, easy and prompt reengagement of the coupling parts is assured as soon as the torque load is removed and without requiring a reversal of rotation.

In the construction shown in Figure 6 a coupling member 27 carries a clutch disc or plate 28 which may be faced with suitable friction material. A complementary coupling member 29 rigidly carries at one end a flange 31 adapted to press against the clutch disc to connect the coupling members. The disc and flange are pressed together by a ring 32 which may be integrally formed as one end of a housing 33 enclosing a spring 34 which engages the flange 31. The spring 34, therefore, tends to squeeze the clutch disc 28 between the flange 31 and the ring 32 to connect the coupling members. To disengage the flange and ring from the clutch disc a plurality of tiltable struts 35 are provided with their ends fitting into recesses formed in the outer portions of the flange and disc. The recesses are preferably formed in substantially the same shape as those shown in Figures 3 and 4.

With the coupling parts engaged, as shown in Figure 6, a part of the torque will be transmitted through the clutch disc and the ring and flange and the remainder of the torque will be transmitted through the struts. Upon an overload, the friction clutch parts will slip slightly causing the struts to move to a more nearly axial position, thereby to separate the flange 31 and ring 32. This relieves the pressure of the flange and ring against the clutch disc interrupting the connection between the coupling parts.

Figure 7 illustrates a clutch substantially similar to that of Figure 6 and in which like parts have been designated by the same reference numerals. In this construction the clutch disc 28, as well as the flange 31 and the ring 32, have their surfaces sinuously shaped or corrugated circumferentially. When the coupling is engaged, the corrugations interfit to form a driving connection. At the same time, the corrugations act as cams tending to separate the clutch parts in response to torque. This tendency towards separation is added to that produced by the struts 35 so that when the torque exceeds a predetermined value, the disc and flange will be separated to permit overrunning or slipping of the clutch. It will be noted that the struts in the forms shown in Figures 6 and 7 will hold the coupling parts disengaged in response to an extremely light torque so that drag and wear are minimized.

While several embodiments of the invention have been shown and described in detail, it will be understood that these are illustrative only and are not to be taken as a definition of the scope of the invention, reference being had for this purpose to the appended claims.

What is claimed is:

1. A coupling comprising coaxial coupling members, clutch parts carried by one of the coupling members, a radially extending flange on the other coupling member, a ring movable relative to the flange and formed to engage the clutch parts, a housing connected to the ring and extending over the flange, a spring between the flange and the end of the housing to urge the ring toward the flange and into engagement with the clutch parts, the flange and the ring being formed with recesses in their facing surfaces, and struts having their ends fitting in the recesses to urge the ring away from the flange in response to torque.

2. A coupling comprising coaxial coupling members, clutch parts carried by one of the coupling members, a radially extending flange on the other coupling member, a ring movable relative to the flange and formed to engage the clutch parts, a housing connected to the ring and extending over the flange, a spring between the flange and the end of the housing to urge the ring toward the flange and into engagement with the clutch parts, the flange and the ring being formed in their facing surfaces with recesses terminating at one side in substantially axial shoulders, and struts having their ends fitting in the recesses to urge the ring away from the flange in response to torque, the struts engaging said shoulders when the ring and flange are separated to limit relative rotation of the ring and the flange.

3. A coupling comprising coaxial coupling members, clutch parts carried by one of the coupling members, a radially extending flange on the other coupling members, a ring movable relative to the flange and formed to engage the clutch parts, a housing connected to the ring and extending over the flange, a spring between the flange and the end of the housing to urge the ring toward the flange and into engagement with the clutch parts, a tiltable strut connecting the ring and the flange to urge the ring away from the flange in response to torque, and friction means connecting the housing and said one clutch part.

4. A coupling comprising coaxial coupling members, a plurality of clutch teeth projecting from one of the members, a ring movable axially of said one of the members and formed with internal clutch teeth to mesh with the first named clutch teeth when the ring is adjacent the other member, a spring urging the ring toward said other member, a tiltable strut connecting the ring to said other member to urge them apart in response to torque and friction means connecting the ring to said one member yieldingly to oppose relative rotation thereof when the clutch teeth are disengaged.

5. A coupling comprising coaxial coupling members, a plurality of clutch teeth projecting from one of the members, a ring movable axially of said one of the members and formed with internal clutch teeth to mesh with the first named clutch teeth when the ring is adjacent the other member, a housing connected to the ring, a spring in the housing urging the ring toward said other member, means connecting the ring and said other member to urge them apart in response to torque, a second ring splined to said one member, and friction means connecting the second ring and the housing.

6. A coupling comprising coaxial coupling members, a plurality of clutch teeth projecting from one of the members, a ring movable axially of said one of the members and formed with internal clutch teeth to mesh with the first named clutch teeth when the ring is adjacent the other member, a housing connected to the ring, a spring in the housing urging the ring toward said other member, a tiltable strut connecting the ring and said other member to urge them apart in response to torque, a second ring splined to said one member, and friction means on the second ring having a lost motion connection therewith and frictionally engaging the housing.

7. A coupling comprising coaxial coupling members, a radial clutch disc carried by one of the members, a flange engageable with the disc carried by the other member, a ring movable toward and away from the flange to engage the disc, a spring urging the ring toward the flange, the engaging surfaces of the ring and the clutch disc having cam portions lying at acute angles to the general planes of the ring and disc and tending to separate the ring and disc in response to torque, and a tiltable strut urging the ring away from the flange in response to torque.

8. A coupling comprising coaxial coupling members, a radial clutch disc carried by one of the members, a flange engageable with the disc carried by the other member, a ring movable toward and away from the flange to engage the disc, a spring urging the ring toward the flange, and a tiltable strut urging the ring away from the flange in response to torque, the disc, the flange and the ring having their engaging surfaces sinuously formed whereby they tend to separate in response to torque.

9. A coupling comprising coaxial coupling members, a radial clutch disc carried by one of the members, a flange engageable with the disc carried by the other member, a ring movable toward and away from the flange to engage the disc, a spring urging the ring toward the flange, and a tiltable strut urging the ring away from the flange in response to torque during the engaged position, and in response to friction drag while in the disengaged position, said strut tilting to provide a much larger mechanical advantage to compress the spring when in the disengaged position than when in the engaged position.

10. A coupling comprising coaxial driving and driven members, spring means uring the members together to produce a driving connection therebetween, an array of tiltable struts arranged to transmit torque between the driving and driven members, said struts being set at an angle to have a relatively small mechanical advantage in response to torque to compress the spring when the members are together, thereby to release the clutch at some predetermined torque load, and friction drag means to hold the clutch members disengaged by transmitting torque between the driving and driven members through said struts when the members are disengaged and the struts are at an angle possessing a relatively large mechanical advantage against the force of the spring.

ADIEL Y. DODGE.

REFERENCES CITED

The following references are of record in the file of this patent:

UNITED STATES PATENTS

| Number | Name | Date |
| --- | --- | --- |
| 1,118,132 | Jones | Nov. 24, 1914 |
| 1,403,018 | Walters | Jan. 10, 1922 |
| 2,151,724 | Wengel et al. | Mar. 28, 1939 |
| 2,391,438 | Muir | Dec. 25, 1945 |

FOREIGN PATENTS

| Number | Country | Date |
| --- | --- | --- |
| 19,837 | Great Britain | of 1908 |
| 306,636 | Great Britain | of 1928 |